March 5, 1935.  H. MITCHELL ET AL  1,993,178
PHOTOGRAPHING DEVICE
Filed Jan. 20, 1933   3 Sheets-Sheet 1

Inventors,
Hunt Mitchell and
Fred A. Nave
By Robert F. Mielle
Atty.

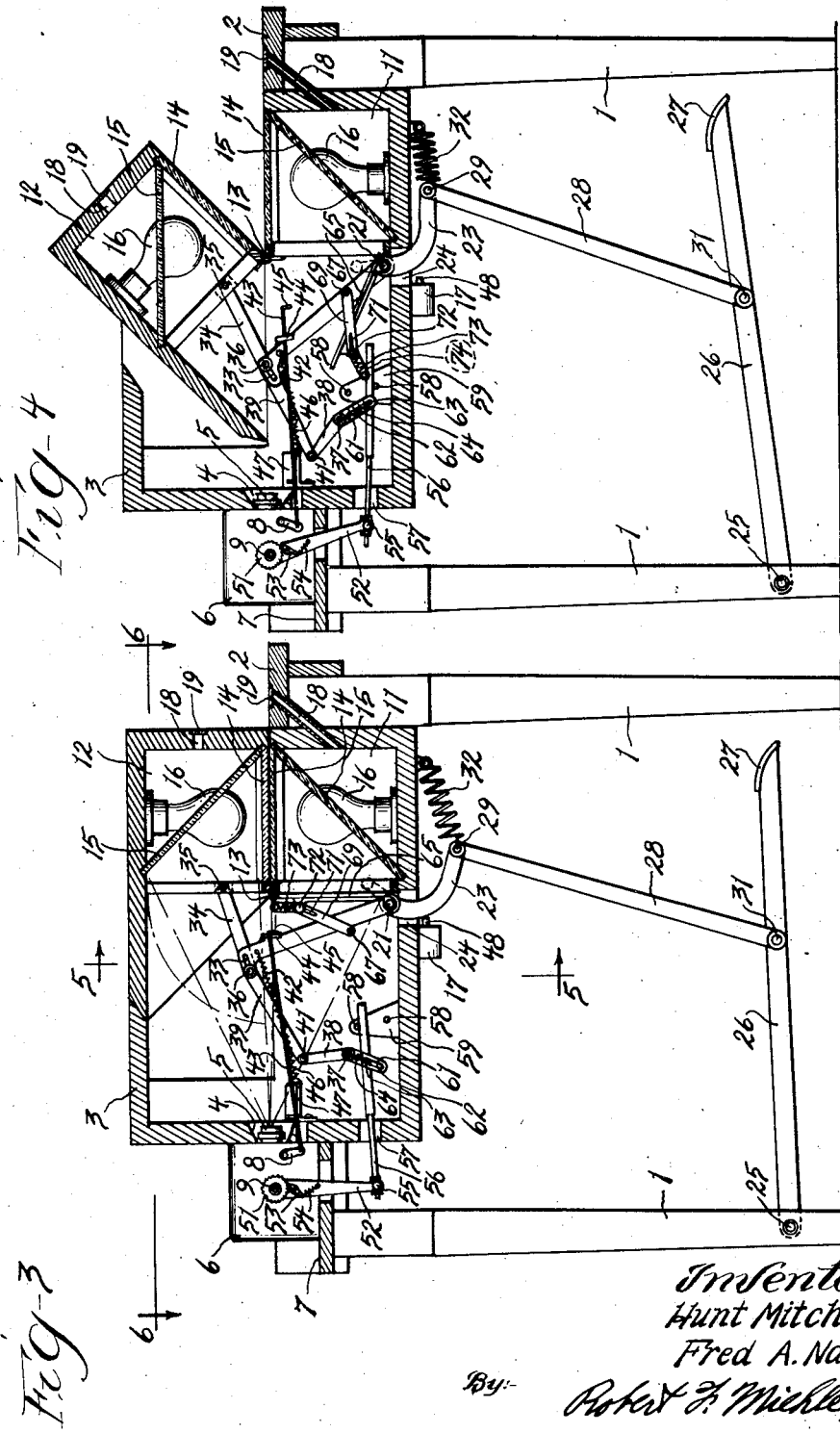

March 5, 1935. H. MITCHELL ET AL 1,993,178
PHOTOGRAPHING DEVICE
Filed Jan. 20, 1933   3 Sheets-Sheet 3
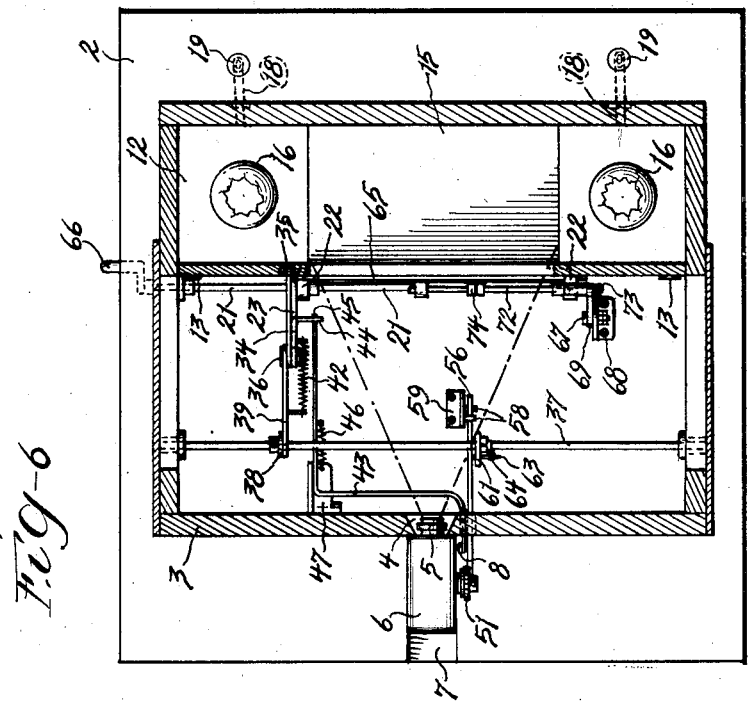
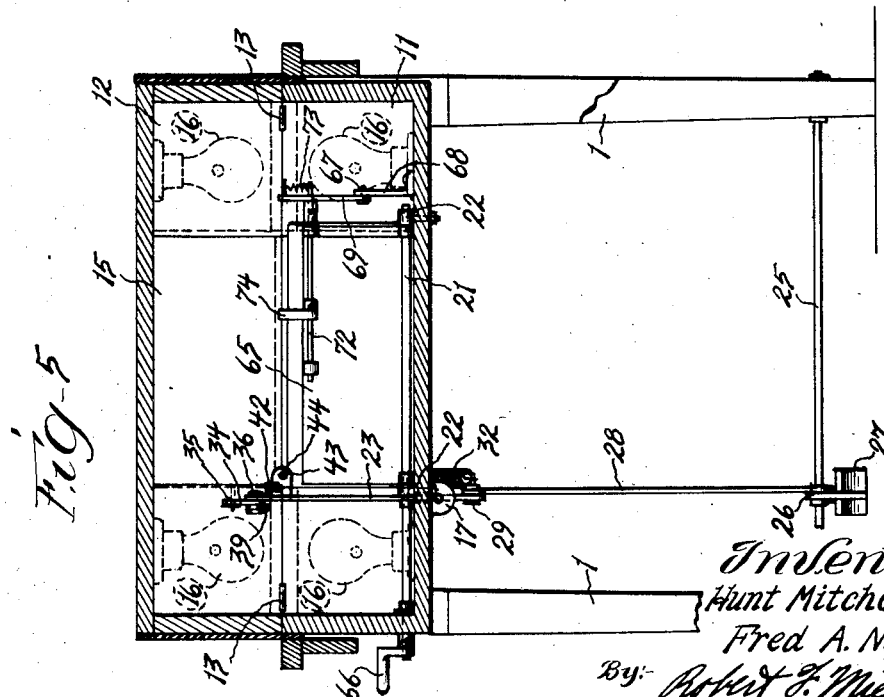
Inventors
Hunt Mitchell and
Fred A. Nave
By: Robert F. Miehle
Atty.

Patented Mar. 5, 1935

1,993,178

UNITED STATES PATENT OFFICE 1,993,178

PHOTOGRAPHING DEVICE

Hunt Mitchell and Fred A. Nave, Carbondale, Ill.

Application January 20, 1933, Serial No. 652,604

18 Claims. (Cl. 88—24)

The invention relates particularly to bank check photographing devices, although not limited to this use alone.

The general object of the invention resides in the provision of a photographic device for simultaneously photographing both sides of a sheet, say a bank check or similar instrument, with a view particularly to convenience and speed of operation and adaptability to use in banks for photographing checks as an incident to the routine of handling checks and for the purpose of providing the banks with exact copies of checks passing through them.

With this object in view our invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 3 is a sectional view substantially on the line 3—3 of Figure 1;

Figure 4 is a view similar to Figure 3 and showing operative parts of the device in different positions from those in which they are shown in Figure 3;

Figure 5 is a sectional view substantially on the line 5—5 of Figure 3; and

Figure 6 is a sectional view substantially on the line 6—6 of Figure 3.

Like characters of reference indicate like parts in the several views.

Figure 1:
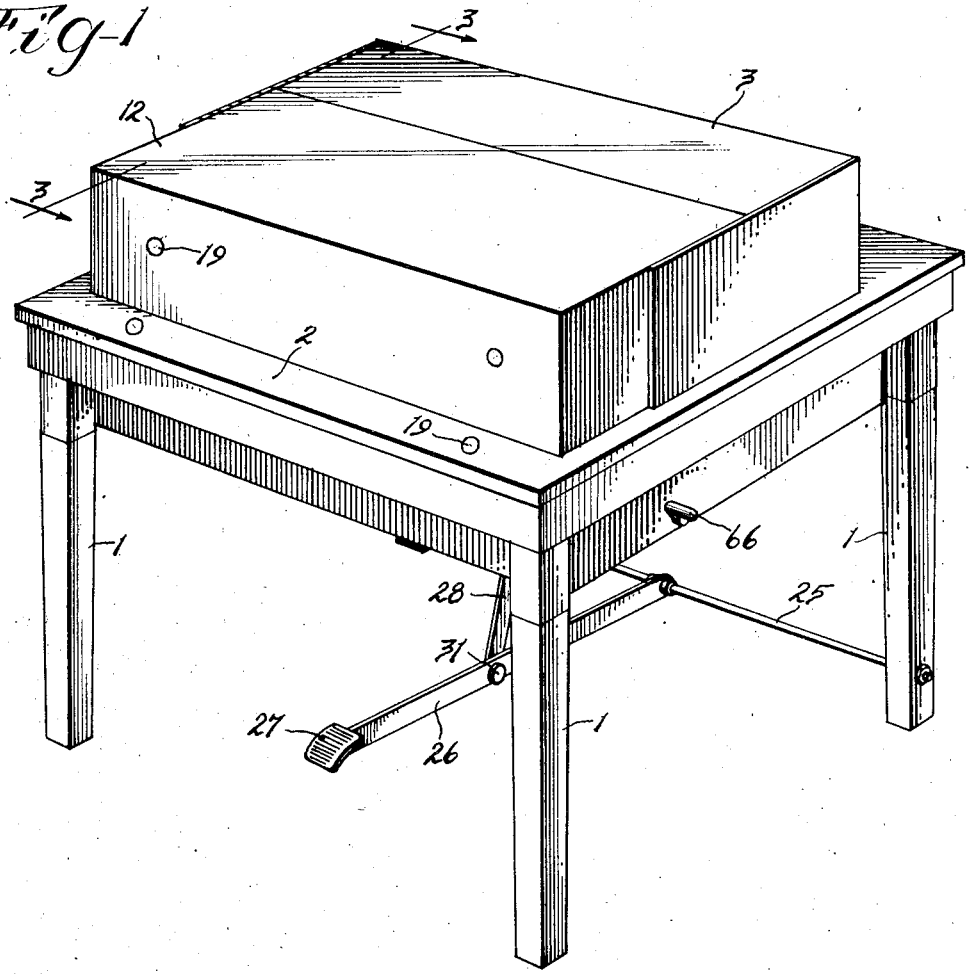
Figure 1 is a perspective view of a photographing device embodying our invention.

Referring to the drawings, the device is preferably incorporated on a suitable stand comprising legs 1 and a top or work bed 2. Formed on the bed 2 is a housing 3 of rectangular box-like construction which is provided centrally at the rear end thereof with a flared opening 4 into which projects the lens barrel 5 of a camera 6, the same being preferably of a type using standard motion picture film, say the amateur standard 16 mm. film.

The camera 6 is removably seated in a depression 7 of the bed 2 and against the rear side of the housing 3, and is provided with a usual exterior lever 8 for actuating the exposure shutter of the camera and with an exteriorly projecting revoluble shaft 9 which is connected with a usual sprocket feed device, not shown, within the camera for advancing a film in the camera across the exposure aperture of the camera for the successive exposure of the film.

The housing 3, at the front end thereof and below the transverse median of the same, is formed with a stationary exposure section 11, while above said transverse median, the housing is formed with a movable exposure section 12 which is hinged at 13, inwardly of and parallel to the front end of the housing and substantially in the plane of said transverse median, for vertical swinging movement into and out of confronting relation with the stationary exposure section 11. The sections 11 and 12 are fitted at their confronting portions with transparent panels 14, such as glass, to accommodate therebetween a sheet to be photographed, such as a bank check or similar instrument.

Carried within the sections 11 and 12 are reflecting elements 15 which converge forwardly and remote from the pivotal axis of the upper section 12, so that when the section 11 is positioned in confronting relation with the section 12, as shown in Figure 3, and a sheet, such as a bank check, is interposed between the panels 14, images of both faces of the sheet will be reflected to the camera lens 5 for the photographing thereof, the lens 5 being central with relation to the center of the housing 3 so that the reflection from the reflecting elements 15 will expose vertically adjoining sections of the film at the camera aperture above and below the horizontal center of the camera aperture. Thus, both sides of the sheet will be simultaneously exposed in the camera, and in the case of the bank check the face will be photographed together with the back thereof bearing the endorsement.

Arranged in the sections 11 and 12, preferably at opposite ends thereof, and, accordingly, at the outer ends of the reflecting elements 15, are electric light bulbs 16 for illuminating these sections, and these bulbs are arranged in normally open electrical circuit by reason of their being energized through a normally open circuit spring plunger switch 17, of usual construction. The sections 11 and 12 are provided with light passages 18 equipped with ruby glass 19 so that the operator may observe whether or not the bulbs 16 are lighted.

A transverse shaft 21 is pivotally mounted in bearings 22 within the housing and is disposed adjacent the lower inner portion of the exposure section 11, and intermediately pivoted on this shaft is a lever 23, the lower end of which extends downwardly through an opening 24 in the bottom of the housing. A rod 25 is secured at the lower portions of the rear legs 1 of the stand and extends horizontally therebetween, and a lever 26 has its rear end pivoted on the rod 25 and is provided at its front end with a foot treadle 27 for downward movement of this lever by the foot of an operator standing at the front of the device.

A link 28 has its opposite ends pivotally connected with the lower end of the lever 23, as designated at 29, and with the intermediate portion of the lever 26, as designated at 31, for operation of the lever 23 in one direction by downward movement of the lever 26, effected by the operator's foot, and a tension spring 32 serves to move the lever 23 and the lever 26 in the opposite direction upon release of foot pressure from the lever 26.

The upper end of the lever 23 is provided with an angularly extending slot 33, and a link 34 has one end pivotally connected with the upper movable exposure section 12, as designated at 35, and is provided at its other end with a stud device 36 which is engaged for pivotal and sliding movement in the slot 33, thus forming a lost motion operating connection between the upper movable exposure section 12 and the lever 23.

A transverse shaft 37 is pivotally mounted at the sides of the housing 3 and extends across within the same, and a lever 38 is secured thereon and extends upwardly therefrom. A link 39 has one end thereof pivotally connected with the stud device 36 and has its other end pivotally connected with the upper end of the lever 38, as designated at 41, for actuation of the shaft 37 with the upper exposure section 12. A tension spring 42 has its opposite ends connected with the lever 23 and link 39 to normally maintain the aforesaid lost motion connection, comprising the stud device 36 and the slot 33, at the end of its movement corresponding with separating or opening movement of the section 12, as shown in Figure 4, and permitting continued movement of the lever 23 in the direction, to position the section 12 in confronting relation with the section 11, after the section 12 is in its confronting relation with the section 11, as shown in Figure 3, for a purpose now to be described.

A connecting rod 43 has its rear end pivotally connected with the camera shutter actuating lever 8 and has its forward end connected with the upper portion of the lever 23 by reason of the rod slidably and pivotally extending through an apertured lateral projection 44 on the lever 23, and having its forward end bent at a right angle, as designated at 45, whereby the camera shutter is actuated by extreme forward movement of the lever 23, as shown in Figure 3, and whereby rearward movement of the lever 23 independently of the rod 43 is permitted, as shown in Figure 4. A tension spring 46 has its ends connected with the rod 43 and a bracket 47 on the housing to normally maintain the rod 43 in its rearward position.

The spring 32 normally maintains the upper exposure section 12 in open position, as shown in Figure 4, and after placing a sheet, such as a bank check, to be photographed on the lower panel 14, the lever 26 is depressed by the operator's foot, whereupon the upper exposure section 12 is moved into confronting relation with the lower exposure section 11 for exposure of both sides of the sheet, and after the section 12 is in confronting relation with the section 11, the camera shutter is actuated to expose the film in the camera by further downward movement of the lever 26 afforded by the aforesaid lost motion connection comprising the slot 33 and stud device 36, as shown in Figure 3.

The aforesaid spring plunger switch 17 has a plunger 48 spring pressed outwardly to open circuit position and arranged to be engaged by the lever 23 to be moved thereby into closed circuit position to energize the bulbs 16 for exposure light upon said further downward movement of the lever 26 just previous to actuation of the camera shutter, whereby the movement of the section 12, the bulbs 16 and the camera shutter are controlled together with obvious convenience.

The aforementioned film feed shaft 9 of the camera has a ratchet wheel 51 secured thereon, and a downwardly extending lever 52 is pivotally mounted concentric with this shaft and is provided with a pivoted pawl 53 maintained in engagement with the ratchet wheel 51 by a spring 54, so that oscillation of the lever 52 effects successive advance of the film in the camera.

The lower end of the lever 52 is pivotally connected, as designated at 55, to a rod 56 which extends into the housing 3 through an opening 57 and has its forward portion disposed between vertically spaced pins 58, mounted on a bracket 59 carried on the bottom of the housing, to limit vertical movement of the rod 56.

Secured on the shaft 37 is a downwardly extending lever 61 provided with a radial slot 62 in which a transverse stud 63, mounted on the rod 56, is slidably and pivotally engaged. A tension spring 64 has its ends connected with the shaft 37 and the stud 63 to maintain the rod 56 in an upper position against the upper pin 58, as shown in Figure 3, the rod 56 being movable downwardly to a lower position against the lower pin 58, as shown in Figure 4.

Thus, the film in the camera is advanced with oscillation of the upper exposure section 12 for the exposure of successive portions of the film in the camera, whereby the film advance is also controlled with movement of the upper section with obvious convenience to the operator.

The advance of the film in the camera by oscillation of the upper exposure section 12 is varied, for a purpose hereinafter described, by the vertical positioning of the rod 56 for the reason that in the upper position of the rod the stud 63 is nearer the axis of the shaft 37 than it is when the rod 56 is in its lower position, with the result that the shaft 9 is given a lesser film advance movement when the rod 56 is in its upper position than that which it is given when the rod is in its lower position.

Secured on the shaft 21 is a shutter 65 which is movable with the shaft from an upper position shutting off exposure from the lower exposure section 11, as shown in Figure 3, to a lower position permitting exposure from the lower exposure section, as shown in Figure 4, the shaft 21 being provided with a crank 66 on the exterior of the housing for the manipulation of this shutter.

Pivotally mounted at one end, as designated at 67, on a bracket 68 carried on the bottom of the housing 3, is a link 69 provided with an intermediate radial slot 71 in which a shaft 72, pivotally mounted on the shutter 65 adjacent its outer edge, is slidably engaged and angularly fixed. A tension spring 73 has its ends connected with the shaft 72 and the outer end of the link 69 and serves to tension the shaft 72 outwardly from the pivotal axes of this link and the shutter 65, the arrangement being such that an over center detent is formed to maintain the shutter in its opposite positions.

When the shutter 65 is in its lower or open position, an arm 74, secured on the shaft 72 bears downwardly on the rod 56 and maintains it in its lower position against the lower pin 58, as shown in Figure 4.

Accordingly, when the shutter 65 is in its lower or open position a greater feed of the film is effected to correspond with the exposure from both the upper and lower exposure sections, whereas, when the shutter 65 is in its upper or shut position, to expose only from the upper exposure section as where it is desired to photograph only one side of a sheet, a lesser feed of the film is effected to correspond with the exposure from only the upper exposure section, with resulting economy in the use of film.

Figure 2:
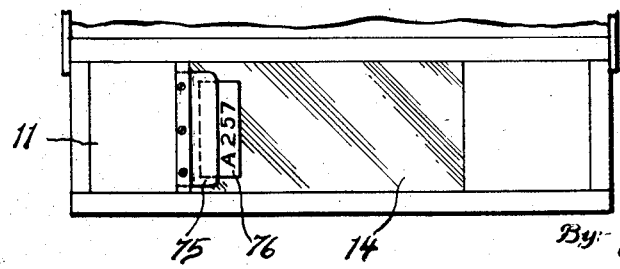
Figure 2 is an interior view of a portion of the device.

In order that the photographs may be identified, say in groups, a thin spring clip 75, see Figure 2, is secured downwardly on the lower exposure section 11 at one end of the glass panel 14 thereof and projects over one end of the panel for securing an indicating member 76 to be photographed with one or a group of sheets or checks.

In operating the device the operator stands at the front of the machine and controls the entire photographing operation with one foot, thus leaving both hands free for manipulating the sheets being photographed, the top 2 forming a work surface extending in a plane with the glass panel 14 of the lower exposure section with obvious convenience.

While we have described and shown one embodiment of our invention, we do not wish to be limited to the precise details of construction as changes may readily be made without departing from the spirit of our invention, but having thus described and shown our invention, we claim as new and desire to secure by Letters Patent the following:

1. In a device of the character described, confronting exposure sections relatively movable to permit insertion therebetween and removal of a sheet to be photographed from both sides, photographic camera shutter controlling means, a movable control element, a lost motion connection whereby said control element effects relative movement of said exposure sections, and means whereby said shutter controlling means is actuated with movement of said control element through said lost motion connection while said exposure sections are in photographing relation.

2. In a device of the character described, confronting exposure sections relatively movable to permit insertion therebetween and removal of a sheet to be photographed from both sides, photographic camera shutter controlling means, photographic camera film advance controlling means, a movable control element, a lost motion connection whereby said control element effects relative movement of said exposure sections, yieldable means normally maintaining said lost motion connection at the end of its movement corresponding with separating movement of said exposure sections, means whereby said shutter controlling means is actuated with continued movement of said control element opposing said yieldable means after said exposure sections are in relative photographing position, and means whereby said film advance controlling means is actuated by said control element.

3. In a device of the character described, an elevated lower stationary exposure section and an upper exposure section adapted to confront the stationary section, transparent panels carried with respective of and arranged at the confronting portions of said sections and adapted to accommodate a sheet to be photographed therebetween, means whereby said upper section is movable away from said lower section to permit insertion and removal of said sheet between said panels, convergently arranged reflecting elements carried with said sections for directing images from both sides of said sheet to a photographic camera, and means under the control of an operator's foot at a point spaced downwardly from said exposure sections for effecting movement of said upper section to and away from said lower section.

4. In a device of the character described, elevated confronting upper and lower exposure sections relatively movable to permit insertion therebetween and removal of a sheet to be photographed on both sides, photographic camera shutter controlling means, photographic camera film advance controlling means, and means under the control of an operator's foot at a point spaced downwardly from said exposure sections whereby said shutter controlling means, said film advance controlling means and relative movement of said exposure sections are controlled together.

5. In a device of the character described, an elevated stationary exposure section and an upper exposure section adapted to confront the stationary section for the photographing of a sheet therebetween, means whereby said upper section is movable away from said lower section to permit insertion and removal of said sheet, convergently arranged reflecting elements carried with said sections for directing images from both sides of said sheet to a photographic camera, means forming a work surface disposed in the region of the plane of confrontation of said sections, and means under the control of an operator's foot at a point spaced downwardly from said exposure sections for effecting movement of said upper section to and away from said lower section.

6. In a device of the character described, an elevated lower stationary exposure section and an upper exposure section adapted to confront the stationary exposure section for the photographing of a sheet therebetween, means whereby said upper section is movable upwardly away from said lower section to permit insertion and removal of said sheet, convergently arranged reflecting elements carried with said sections for directing images from both sides of said sheet to a photographic camera, means forming a work surface disposed in the region of the plane of confrontation of said sections, photographic camera shutter controlling means, photographic camera film advance controlling means, and means under the control of an operator's foot at a point spaced downwardly from said exposure sections whereby said shutter controlling means, said film advance controlling means and movement of said upper exposure section are controlled together.

7. In a device of the character described, an elevated housing having a lower stationary exposure section below its transverse median and an upper exposure section above said transverse median to confront the stationary section with a sheet to be photographed therebetween, means whereby said upper exposure section is pivotally mounted with reference to said lower section on an inwardly disposed axis substantially in the plane of said median to permit insertion and removal of said sheet between said sections, convergently arranged reflecting elements carried with said sections and having their line of convergence extending correspondingly with said axis and disposed remote therefrom for directing images within said housing from both sides of said sheet to a photographic camera, and means under the control of an operator's foot at a point spaced downwardly from said housing for effecting movement of said upper section to and away from said lower section.

8. In a device of the character described, elevated confronting upper and lower exposure sections of which the upper section is pivotally movable on a horizontal axis into and out of confronting relation with the lower section, photographic camera shutter controlling means, photographic camera film advance controlling means, a movable member operated in one direction by an operator's foot and yieldably urged in the opposite direction, a lost motion connection whereby said foot operated member effects said movement of said upper enclosure section, spring means normally maintaining said lost motion connection at the end of its movement corresponding with movement of said upper exposure section away from said lower exposure section, and means whereby said film advance controlling means is actuated during movement of said upper section.

9. In a device of the character described, means for directing images from both sides of a sheet to a photographic camera, a shutter movable to shut off exposure from one side of said sheet, photographic camera film advancing means, and means under the control of said shutter for causing a lesser advance of a film by said film advancing means when said shutter is in shut off position than when it is in open position.

10. In a device of the character described, means for directing images from both sides of a sheet to a photographic camera and comprising exposure sections relatively movable to permit insertion therebetween and removal of a sheet, a shutter movable to shut off exposure from one side of said sheet, photographic camera film advancing means, means whereby said film advancing means is actuated with relative movement of said exposure sections, and means under the control of said shutter for causing a lesser advance of a film by said film advancing means when said shutter is in shut off position than when it is in open position.

11. In a device of the character described, confronting exposure sections relatively movable to permit insertion therebetween and removal of a sheet, convergently arranged reflecting elements carried with said sections for directing images from both sides of said sheet to a photographic camera, and sources of exposure light carried with said exposure sections at the ends of said reflecting elements spaced along the axis of convergence of said reflecting elements.

12. In a device of the character described, confronting exposure sections relatively movable pivotally on an axis corresponding with the plane of confrontation thereof to permit insertion therebetween and removal of a sheet, convergently arranged reflecting elements carried with said sections for directing images from both sides of said sheet to a photographic camera, and sources of exposure light carried with said exposure sections at the ends of said reflecting elements spaced along said axis.

13. In a device of the character described, confronting exposure sections relatively movable pivotally on an axis corresponding with the plane of confrontation thereof to permit insertion therebetween and removal of a sheet, convergently arranged reflecting elements carried with said sections for directing images from both sides of said sheet to a photographic camera and having their axis of convergence disposed remote from the pivotal axis of said exposure sections, electrically energized sources of exposure light carried with respective of said exposure sections at the ends of said reflecting elements spaced along said axes, and a switch controlling the energization of said sources of exposure light and under control of relative movement of said exposure sections to energize said sources when said exposure sections are in confronting relation.

14. In a device of the character described, a lower stationary exposure section and an upper exposure section adapted to confront the stationary section, transparent panels carried with respective of and arranged at the confronting portions of said sections and adapted to accommodate a sheet to be photographed therebetween, means whereby said upper section is pivotally movable away from said lower section on an axis corresponding with a side of said panels to permit insertion and removal of said sheet between said panels, and convergently arranged reflecting elements carried with said sections and having their line of convergence extending correspondingly with said axis and disposed remote therefrom for directing images from both sides of said sheet to a photographic camera.

15. In a device of the character described, a lower stationary exposure section and an upper exposure section adapted to confront the stationary section, transparent panels carried with respective of and arranged at the confronting portions of said sections and adapted to accommodate a sheet to be photographed therebetween, means whereby said upper section is movable upwardly away from said lower section to permit insertion and removal of said sheet between said panels, convergently arranged reflecting elements carried with said sections for directing images from both sides of said sheet to a photographic camera, and means forming a work surface extending in a plane with the transparent panel of the lower section.

16. In a device of the character described, a lower stationary exposure section and an upper exposure section adapted to confront the stationary section, transparent panels carried with respective of said sections and adapted to accommodate a sheet to be photographed therebetween, means whereby said upper section is pivotally movable away from said lower section on an axis corresponding with a side of said panels to permit insertion and removal of said sheet between said panels, and convergently arranged reflecting elements carried with said sections and having their line of convergence extending correspondingly with said axis and disposed remote therefrom.

17. In a device of the character described, a housing having a lower stationary exposure section below its transverse median and an upper exposure section above said transverse median to confront the stationary section with a sheet to be photographed therebetween, means whereby said upper section is pivotally mounted with reference to said lower section on an inwardly disposed axis substantially in the plane of said median to permit insertion and removal of said sheet, and convergently arranged reflecting elements carried with said sections and having their line of convergence extending correspondingly with said axis and disposed remote therefrom for directing images within said housing from both sides of said sheet to a photographic camera.

18. In a device of the character described, a housing having a stationary exposure section below its transverse median and an upper exposure section above said transverse median to confront the stationary section and pivotally movable on an inwardly disposed axis substantially in the plane of said median, transparent panels carried at the confronting portions of said sections and adapted to accommodate a sheet therebetween, reflecting elements arranged in said sections in forwardly convergent relation for directing images from both sides of said sheet to a camera lens disposed centrally with respect to said sections, electric light bulbs arranged in normally open electric circuit and disposed in said sections at the outer ends of said reflecting elements, a switch for said circuit and under the control of said upper section to energize said bulbs when said sections are in confronting relation, and means forming a work surface in a plane with the transparent panel of the lower section.

HUNT MITCHELL.
FRED A. NAVE.